(12) United States Patent
Leidl et al.

(10) Patent No.: US 8,009,407 B2
(45) Date of Patent: Aug. 30, 2011

(54) ADJUSTABLE CAPACITOR AND CIRCUIT PROVIDED THEREWITH

(75) Inventors: Anton Leidl, Hohenbrunn (DE); Wolfgang Sauer, Taufkirchen (DE); Stefan Seitz, Windach (DE)

(73) Assignee: Epcos AG, Munich (DE)

( * ) Notice: Subject to any disclaimer, the term of this patent is extended or adjusted under 35 U.S.C. 154(b) by 730 days.

(21) Appl. No.: 12/064,869

(22) PCT Filed: Sep. 12, 2006

(86) PCT No.: PCT/DE2006/001595
§ 371 (c)(1),
(2), (4) Date: Jun. 30, 2008

(87) PCT Pub. No.: WO2007/031061
PCT Pub. Date: Mar. 22, 2007

(65) Prior Publication Data
US 2008/0253056 A1    Oct. 16, 2008

(30) Foreign Application Priority Data
Sep. 16, 2005 (DE) .......... 10 2005 044 330

(51) Int. Cl.
*H01G 4/06* (2006.01)
(52) U.S. Cl. ........ 361/311; 361/272; 361/277; 361/278; 361/312; 361/313
(58) Field of Classification Search .......... 361/277, 361/278–279, 272–273, 283.3, 287–288, 361/290–292, 311, 312–313, 321.1, 321.2, 361/283.1
See application file for complete search history.

(56) References Cited

U.S. PATENT DOCUMENTS

| | | | |
|---|---|---|---|
| 6,417,740 B1 * | 7/2002 | Anh et al. ............. | 331/48 |
| 6,509,813 B2 | 1/2003 | Ella et al. | |
| 6,933,807 B2 | 8/2005 | Marksteiner et al. | |
| 7,495,882 B2 * | 2/2009 | Petz et al. ............. | 361/277 |
| 7,808,254 B2 * | 10/2010 | Seppa et al. .......... | 324/661 |
| 2004/0238866 A1 | 12/2004 | Iwashita et al. | |
| 2006/0164183 A1 | 7/2006 | Tikka et al. | |

FOREIGN PATENT DOCUMENTS
EP    0 913 001    2/2004
(Continued)

OTHER PUBLICATIONS

Koutsaroff I. P. et al "Dielectric Properties of (BaSR)TiO3 Thin Film Capacitors Fabricated on Alumina Substrates" Materials Research Society Symposium Proc. vol. 748, 2003 Materials Research Society.

(Continued)

*Primary Examiner* — Nguyen T Ha
(74) *Attorney, Agent, or Firm* — Fish & Richardson P.C.

(57) ABSTRACT

A capacitor includes a multi layer structure on a ceramic or crystalline substrate. The multilayer structure includes a lower electrode, an upper electrode, and a dielectric that is tunable by a voltage applied to the electrodes. The multilayer structure is configured such that resonant oscillation modes of bulk acoustic waves can be propagated in the multilayer structure and such that the resonant frequencies of the oscillation modes are outside a first band range of between 810 and 1000 MHz, second band range of between 1700 and 2205 MHz and third band range of between 2400 and 2483.5 MHz.

22 Claims, 9 Drawing Sheets

FOREIGN PATENT DOCUMENTS

EP 1 418 671 5/2004
WO WO2004/034579 4/2004

OTHER PUBLICATIONS

Koutsaroff I. P. et al "Microwave Properties of parallel Plate Capacitors based on (Ba.Sr)TiO3 Thin Films grown on SiO2/A/2O3 Substrates" Materials Research Society Symposium Proc. vol. 784, 2004, Materials Researeh Society, pp. 319-325.

Tappe S. et al "Electrostrictive Resonances in (Ba0.7Sr0.3)TiO3 Thin Films at Microwave Frequencies" Applied Physics Letters, vol. 85, No. 4, Jul. 2004 pp. 624-626.

York R. A. et al "Synthesis and Characterization of (BaxSr1-x)Ti1+yO3+z Thin Films and Integration into Microwave Varactors and Phase Shifters" Integrated Forroelectrics, 2001, vol. 34, pp. 177-188.

International Search Report for PCT/DE2006/001595.
Written Opinion for PCT/DE2006/001595.
English translation of Written Opinion for PCT/DE2006/001595.

* cited by examiner

Key: 1  Without mirror layers

One pair of mirror layers

Two pairs of mirror layers

Key: 1 Without mirror layers

One pair of mirror layers

Two pairs of mirror layers

Figure 8

Key: 1   Quality factor Q

Figure 9

Key:  1   Quality factor Q

Figure 10

Key: 1    Quality factor Q

Figure 11

Key: 1 Quality factor Q

Figure 12

Key:  1  Quality factor Q

ADJUSTABLE CAPACITOR AND CIRCUIT PROVIDED THEREWITH

CROSS REFERENCE TO RELATED APPLICATIONS

Pursuant to 35 USC §120, this application claims the benefit of PCT/DE2006/001595 filed Sep. 12, 2006 which claims the benefit of German Patent Application No. 102005044330.3 filed Sep. 16, 2005. Each of these applications, is incorporated by reference in its entirety.

BACKGROUND

Like all other components, capacitors used in microelectronics must be further and further miniaturized in order to make correspondingly smaller, more energy-saving or merely more powerful terminal devices possible. For capacitors, dielectrics with relatively high dielectric constants can be used. Dielectric constants of more than 1000 can be achieved with ferroelectrics such as lead zirconate titanate (PZT), barium strontium titanate (BST), strontium titanate and others, depending on material and composition. When a voltage is applied to such ferroelectrics, piezoelectric behavior often appears in these materials, wherein the piezoelectric constant of these materials rises above 0.1 $C/m^2$. In addition, the relative dielectric constant is usually likewise voltage-dependent. This opens the possibility of producing capacitors with ferroelectrics that are voltage-dependent or tunable by varying voltage.

Miniaturized capacitors and capacitors produced with thin-film technology can be structured as a plate, an interdigital, or a trench arrangement (pit capacitors). The highest capacitance densities, i.e. the highest capacitance of the thin-film capacitor per unit surface of the substrate material, are achieved with pit capacitors. These are difficult to manufacture, however. Plate capacitors with a dielectric layer arranged parallel to the substrate surface between two electrodes can achieve a capacitance density of up to 100 $fF/\mu m^2$ with the ferroelectric at a dielectric thickness of roughly 100 nm. A capacitor with a 10 pF capacitance then has a surface area of only $10\times10$ $\mu m^2$.

Components constructed as plate capacitors in multilayer technology can achieve further increased capacitance densities, but are technologically more complicated. Interdigital capacitors, for which only one metal layer need be structured as an interdigital structure, are easy to manufacture. With a typical electrode spacing of roughly 500 nm, the capacitance densities that can be achieved are less than 1 $fF/\mu m^2$. A capacitor with a 10 pF capacitance then has a surface area of more than $10\times100$ $\mu m^2$.

SUMMARY

A disadvantageous effect of capacitors with piezoelectric behavior, and in particular with a voltage-dependent piezoelectric behavior, is the resulting variable quality factor curve at different frequencies. In certain frequency ranges capacitors with piezoelectric dielectrics display sharply reduced quality factors that can be traced back to acoustic resonances inside the capacitor structure. These resonances can strongly reduce the functionality of such components and make them unusable at frequencies which are generally rather high. These disadvantages have so far had the effect that high-capacitance capacitors have not been widely used in circuits and circuitry operating at mobile telephone frequencies.

The problem is therefore to specify a capacitor that is usable for HF applications and has a sufficient quality factor there.

It was found that the acoustic resonance frequencies of a piezoelectric capacitor are determined by the mechanical properties of the individual layers used in the capacitor and thus by the entire layer structure. The speed of sound in the individual layers, their thickness and also the impedance jumps at the boundary surfaces between the layers contribute to the resonant behavior. A high-impedance difference between two adjacent layers implies a high reflection at the boundary surface, so that a standing wave can form between two boundary surfaces with impedance jumps, which turns the component into a resonator.

In a layer structure however, there are normally a number of material transitions and thus potential reflective boundary surfaces that lead to the appearance of several resonances. A capacitor therefore has a multilayer structure that comprises at least one lower and one upper electrode as well as a dielectric arranged between them, wherein resonant oscillation modes of bulk acoustic waves can propagate in the layer structure. In this layer structure, a resonant behavior is adjusted by suitable selection of materials, the number of layers used and their thicknesses such that the resonant frequencies of the oscillation modes capable of propagation lie outside three essential band ranges employed and used in mobile telephones. In particular this is a first band range between 810 and 1000 MHz, a second band range between 1700 and 2205 MHz and a third band range between 2400 and 2483.5 MHz. The first and second band range are used for the two GSM mobile telephone bands as well as for UMTS, while the third frequency range is used for WLAN. In a capacitor, therefore, resonators are deliberately formed and their resonant frequencies are arranged in a suitable manner such that the aforementioned band ranges are sufficiently remote from them that the capacitor has a sufficiently high quality factor in the aforementioned band ranges. Between the band ranges, the quality factor of the capacitor can decline to arbitrarily low values, but it remains at a sufficiently high level in the band ranges in which it is to be used that the capacitor is completely usable in the aforementioned band ranges.

Strontium titanate, barium/strontium titanate or lead zirconate/titanate are used as a preferred dielectric in the capacitor. All of these materials have a voltage-dependent relative dielectric constant, and make the capacitor tunable.

It is advantageous for the use of the capacitor to design the layer structure such that a fourth band range between 5150 and 5250 MHz, with the WLAN frequencies situated there, remains free. The capacitor with these four band ranges free of resonant frequencies, and accordingly sufficiently high quality factors in the band ranges, is universally functional for nearly all frequencies currently used in mobile communication, and can therefore be employed in the corresponding devices and circuits.

A first general solution for a capacitor with a layer structure and resonant frequencies outside the four above-mentioned band ranges is to design the entire layer structure to be thin enough that the lowest resonant frequency appears only above the fourth band range, i.e., above 5250 MHz. For this, the entire layer thickness must be markedly less than 0.5 µm. Then, however, the relatively thin capacitor electrodes, each thinner than 200 nm, are disadvantageous. For technical reasons, however, growth and adhesion layers with low electrical conductivity are necessary for the ferroelectric materials that are used, leading to higher electrical losses for the aforementioned small overall layer thickness, which severely limit the usage possibilities of such components.

A second general approach is to situate the lowest resonant frequency between 2483.5 MHz and 5150 MHz and to shift the second resonant frequency into a range above 5250 MHz. Realizing this, however, requires layer structures with individual layer thicknesses that lie beneath the optimal layer thicknesses for low losses. Therefore functional capacitors can be constructed that are improved with respect to the first solution possibility, but are not yet suitable for all usage possibilities.

A third general solution possibility lies in a capacitor with a lowest resonant frequency between 2250 and 2400 MHz, while additional resonant frequencies lie between 2483.5 MHz and 5150 MHz and/or above 5250 MHz. This requires a bandwidth of 150 MHz for the first resonant frequency. This implies that at a distance of 75 MHz away from this resonant frequency with minimal quality factor, the quality factor of the capacitor must again have risen sufficiently high. This can be achieved however, by improving the reflection at the crucial boundary surfaces. This can be achieved by constructing the boundary surface of the layer structure towards the substrate to be particularly smooth.

However, a capacitor in which an acoustic mirror is constructed in the lowest layer area is further improved. An acoustic mirror is known from the BAW (bulk acoustic wave) resonators and FBAR (film bulk acoustic wave resonator) resonators used in filter technology. It consists of at least one layer pair comprising a respective high-impedance layer and a low-impedance layer, wherein a sufficient reflection effect for the acoustic mirror appears whenever the ratio of the two acoustic impedances $Z_N/Z_H<0.66$ or the ratio $Z_H/Z_N>1.5$. In particular, heavy metals such as platinum, molybdenum, tungsten, copper, gold or TiW, whose acoustic impedances lie in the range between 40 and $100\times10^6$ kg/m$^2$s, can be used as high-impedance layers. In particular, silicon oxide, silicon nitride or aluminum, alongside other relatively low specific-gravity materials whose acoustic impedances lie between 13 and 21, can be considered for low-impedance layers.

An acoustic mirror can be adjusted in its reflection behavior to a certain center frequency with wavelength $\lambda_m$ if the thicknesses for the layer pair of the mirror are adjusted to a value of $\lambda_m/4$. For a wavelength $\lambda_m$ maximum reflection occurs with a reflection factor of 1. The bandwidth of the mirror, i.e., the frequency range in which a sufficient reflection takes place increases with decreasing quality factor of the mirror. A sufficiently high reflection effect can therefore be achieved in a mirror if several layer pairs of high and low-impedance layers are arranged one above the other and their center frequencies are offset with respect to one another. Alternatively, the quality factor of a mirror can be reduced. In a capacitor with an integrated acoustic mirror, however, the resonance of the resonators contained in the capacitor layer structure is improved in all cases, and thus their bandwidth is reduced. A layer pair well-suited for the acoustic mirror of capacitors comprises, for instance, a double layer of 800 nm platinum and 900 nm silicon dioxide. Between 0.9 and 2.1 GHz, i.e., in the range between the first and second blocking region, this layer pair has a reflectivity factor of nearly 1 relative to longitudinal waves.

A fourth possibility in principle for realizing a desired capacitor consists in the construction of a layer region with resonators and partial resonators, the lowest resonant frequency of which lies between 1000 MHz and 1700 MHz, as well as possible additional resonant frequencies between 2250 MHz and 2400 MHz as well as between 2483.5 and 5150 MHz, as well as over 5250 MHz. For this variant, sufficiently thick metallizations can be used, which result in a low electrical resistance. Moreover, a sufficient bandwidth of 700 MHz exists between the first and the second band range that the quality factor of the capacitor in the adjacent first and second band range can again increase to a sufficiently high value.

A fifth possibility in principle for realizing a capacitor lies in a layer structure having a lowest resonant frequency below 810 MHz and additional resonant frequencies between 1000 and 1700 MHz, between 2205 and 2400 MHz, between 2483.5 and 5150 MHz as well as over 5250 MHz. With a lowest resonant frequency below 810 MHz, thick electrodes with a low electrical resistance can be employed. Higher harmonic and additional resonances have a relatively narrow frequency separation between one another, however, so that an expensive and carefully adjusted layer structure is necessary to keep the desired bandwidths free of resonant frequencies The resonators are constructed on ceramic or crystalline substrates, in particular, on crystalline silicon or on aluminum oxide. Particularly in the latter case, a dielectric layer that has a good planarization effect and compensates for the technically induced high roughness of the aluminum oxide surface is preferred as the lowest layer of the layer structure. Well suited for this are, for instance, silicon oxide and silicon nitride layers. Above this dielectric layer, the thickness of which contributes to the determination of the capacitor's resonant frequencies, it is possible to arrange additional dialectic layers. Preferably, however, the first electrode of the capacitor is arranged directly above the lowermost dielectric layer. The electrode can be single-layer or multilayer. It is possible, for instance, to provide a two-layer electrode consisting of a first highly conductive metal with low-impedance and a second electrode layer of a metal with relatively high acoustic impedance. A platinum layer, which can simultaneously serve as a growth and adhesion layer for the ferroelectric, is preferred for the high-impedance layer.

It is also possible to select the material for a multilayer capacitor electrode in such a manner that only a low impedance jump, which does not lead to any interfering reflections, appears between the two material layers. Such a layer combination is then seen by the acoustic wave as a uniform layer, and is considered as only a single layer in the calculation of the resonant frequencies.

The ferroelectric layer, which may require an adhesion layer between it and the electrode layer, preferably has a layer thickness greater than or equal to 100 nm. Due to possibly differing speeds of the acoustic wave, the optimal layer thickness for ferroelectric layers of different composition may possibly deviate from this value. An additional adhesion layer above the ferroelectric layer for improving the upper electrode layer may also be necessary. Thin layers of platinum or TiW, for example, are suited for this purpose. Because of their poor electrical conductivity, these layers are preferably designed to have a minimal thickness. The additional layers for the upper electrode then comprise at least one additional highly conductive, or merely sufficiently thick, layer of aluminum, copper, or gold, for example. Finally, one or more dielectric layers that serve as a passivation layer for the electrode layers can be provided. In addition to oxide or general ceramic layers, the passivation layer can also be an organic polymer such as BCB (benzocyclobutene), SOG (spin on glass), parylene, photoresist and other materials.

In a layer structure for the capacitor it can be necessary to introduce additional impedance jumps by means of additional layers of suitable impedance. When adjusting suitable resonances, however, it also possible to arrange layer transitions between individual layers to be invisible and thus nonreflective, to absorb the acoustic wave or to "smear" the reflection, or make it indistinct. Layer boundaries invisible to the acoustic wave are obtained between materials of identical or similar acoustic impedance. Thus, for example, silicon oxide and aluminum have nearly identical acoustic impedances, so that a silicon oxide/aluminum double layer can be considered a single layer in acoustic terms.

Viscous layers generally lead to a reduction of reflection and thus reduce the resonance of the standing wave, which improves the quality factor of the entire capacitor independently of the wavelength. In particular, the aforementioned passivation layers can be constructed as viscous layers, for example, polymer layers.

A "smeared" reflection is obtained with a phase boundary of sufficiently high roughness. Even a surface roughness with structure sizes greater than 100 nm at the boundary with the next layer leads to a reduction of the reflection. A surface roughness having structures at least 0.5 µm in size is quite suitable. A rough surface reduces the resonance, since the acoustic wave sees layers of thicknesses that differ as a function of the structure sizes at the surface, which leads to a widening of the bandwidth of the reflection and thereby reduces the intensity of the resonance.

The surface of a ceramic substrate consisting of aluminum oxide is an inherently rough surface with reduced reflection. In order not to disrupt the remainder of the layer structure with regard to homogeneity and planarity of the layers, the subsequent phase boundary can be made sufficiently flat with a first dielectric layer that has a planarizing effect. Alternatively or additionally, it is also advisable to roughen the surface of the uppermost layer and thus to realize the phase boundary with air, which boundary has a particularly high impedance jump, with lower reflexivity, or with a smeared reflection behavior.

Apart from the optimization of the layer structure, the general electrical losses of the capacitor can be reduced, and thus its quality factor generally improved. Thus the electrical resistance of the supply electrodes for the capacitor can be reduced, for example, and the electrical quality factor of the capacitor thereby increased. For this purpose, the conductivity of the supply electrodes, usually manufactured from the same material or the same layer combination as the capacitor electrodes due to the integrated manufacturing process, can be improved considerably by thickening with sufficiently conductive metals. It is possible, for instance, to provide the supply electrodes by means of a thickening of aluminum, gold, copper or other metals.

A supply line with low resistance is also achieved if a capacitor with a rectangular footprint is used and the supply line is on the edge of the longer side.

A capacitor already achieves a capacitance of 10 pF, sufficient for most circuitry environments, with a surface area of 10×10 µm2. The small component size alone makes it disadvantageous to manufacture a capacitor as a discrete component. Rather, capacitors according to the invention are integrated together with a circuitry environment on the surface of the substrate, and insofar as the latter is a semiconductor substrate, are also produced inside the substrate. It is also possible to use a multilayer substrate having several metallization planes, which are separated from one another by dielectric layers. In that way, passive components such as resistors, inductors and capacitors can be realized inside the substrate by structuring the metallization planes and connecting different metallization planes by means of plated through-holes through the dielectric layers. The capacitors can be replaced in whole or in part by the invented capacitors with ferroelectric dielectrics. It is also possible, however, to connect the aforementioned capacitors to discrete circuit elements, or to chip components comprising integrated circuits, in a circuitry environment on the substrate. A component can also comprise more than one capacitor of the invention, wherein the different capacitors can be designed for different frequency ranges, each capacitor having a maximum quality factor in a given band range, with the ranges of maximum quality factor differing for the two capacitors.

Various embodiments will be described in detail below on the basis of embodiments and the associated figures. In a schematic representation not true to scale, they show, in their entirety or in certain sections, capacitors, layer structures, circuits, and measurement curves determined on corresponding components.

DETAILED DESCRIPTION

Figure 1:
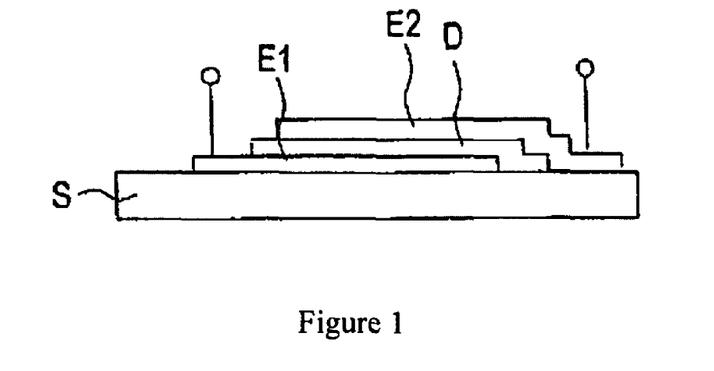
FIG. 1 shows a capacitor in schematic cross section.

FIG. 1 shows in schematic cross section a plate capacitor constructed as a multilayer structure on a substrate S. The substrate is suitable as a carrier substrate, preferably crystalline or ceramic in structure, and consists, for example, of glass, aluminum oxide or silicon. The capacitor comprises at least one lower electrode E1 that is placed directly, or with the interposition of one or more electrically conductive or dielectric layers, on substrate S. A ferroelectric such as barium/strontium titanate is arranged above it as dielectric D. This dielectric can be produced with a thickness of from less than 100 nm to several 100 nm, e.g., 400 nm. Thus it is assured that only low control voltages are necessary to exploit the inherently high tunable dielectric constant fully over its entire range of variation. Even in this simple configuration, high capacitance densities of ca. 100 fF/µm2 can be achieved.

The second electrode layer E2 is arranged above dielectric layer D. If appropriate, an additional adhesion layer can be arranged, preferably likewise electrically conductive metals or alloys, which thereby contribute to the electrode function and hence represent component layers of second, upper electrode E2.

Figure 2:
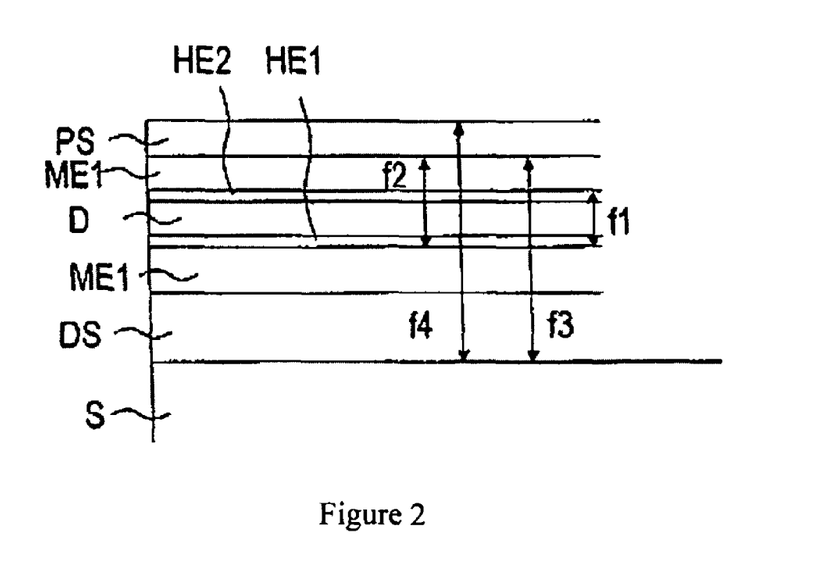
FIG. 2 shows the layer structure of a capacitor in cross section.

FIG. 2 shows in schematic cross section an example of a layer structure for the capacitor. An electrically insulating dielectric layer DS1 with a planarizing effect, an SiO2 layer on an aluminum oxide substrate, for example, is arranged on top of substrate S. Lower electrode layer E1 comprises a first highly conductive metal layer ME1 and a relatively thin combined growth and adhesion layer HE1. Al is preferred as conductive lower electrode layer ME1 and platinum as adhesion layer HE1. Alternatively, the lower electrode is constructed as an adhesion layer sufficiently thick for conductivity, i.e., made of an electrode material with good adhesion properties for the dielectric. Dielectric layer D is a ferroelectric that is chosen with respect to its composition such that is tunable in its permittivity via voltage-applied to the electrodes. Second electrode layer E2 arranged thereabove is again composed of an adhesion layer HE2 and a highly conductive or sufficiently thick metal layer ME2. Adhesion layer HE2 can also be multi-layer and comprise one or more layers selected from platinum, Pt—TiW, Ti, NiCr and so forth. The necessity of such an adhesion layer is dependent on the exact layer structure in question and on the application process that was selected. Adhesion layers HE1 and HE2 are optimized to the minimal layer thickness in order to not reduce the conductivity of the overall electrode layer E1 or E2 unnecessarily.

Upper highly conductive metal layer ME2 is preferably a highly conductive metal such as aluminum, gold, copper, or other appropriate metals. The upper electrode can alternatively consist of a single layer, e.g., a thick platinum layer.

Finally, a passivation layer, selected from silicon nitride, silicon oxide or the polymers and glasses mentioned above, is applied.

In the general layer structure shown, there are acoustically relevant boundary surfaces due to sufficiently high impedance differences between the substrate and dielectric layer DS1, between lower conductive layer ME1 and lower adhesion layer HE1, between upper adhesion layer HE2 and upper conductive layer ME2, between upper conductive layer ME2 and passivation layer PS, as well as between the passivation layer and the surrounding medium, which is usually air.

In the illustrated example, a total of four component resonators are formed, each associated with its own resonant frequency f1-f4. The dimensions of the component resonators are labeled in the figure by the corresponding double arrows. Due to the selected layer thickness ratios, f1>f2>>f3>f4. In general, the resonant frequency is higher the thinner the layer stack is in which the resonance develops. The layer stacks are preferably as thin as possible.

An overall thickness of less than 500 nm may result for the layer stack between the lower conductive layer and the upper conductive layer, which is associated with resonant frequency f1, wherein an acoustic resonant frequency of more than four gigahertz can be associated with such a stack.

Resonance f2 forms between lower conductive layer ME1 and the passivation layer. For a minimum layer thickness of the upper metallization of ca. 100 nm to ca. 1 μm, a resonant frequency f2 of less than one gigahertz to ca. four gigahertz can be associated with this stack.

As a function of the thickness of lower dielectric layer DS1 or passivation layer PS, the additional resonant frequencies f3 and f4 are arranged at correspondingly lower frequencies. However, the layer structure is always optimized such that the capacitor has no resonance in the above-mentioned three band ranges. In the layer structure represented in FIG. 2, the resonant frequency f4 can be suppressed or reduced by a roughening of the surface of the passivation layer, or by use of appropriately viscous or polymeric materials, so that a higher quality factor can be maintained in the band range corresponding to resonance f4, despite resonance occurring to some extent.

Figure 3A:
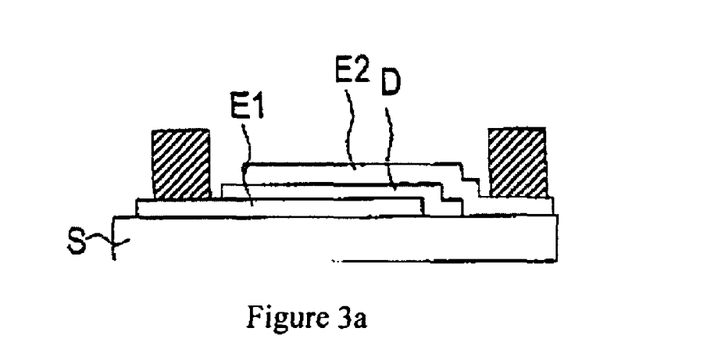
FIGS. 3a and 3h show capacitors with thickened supply lines.
Figure 3B:
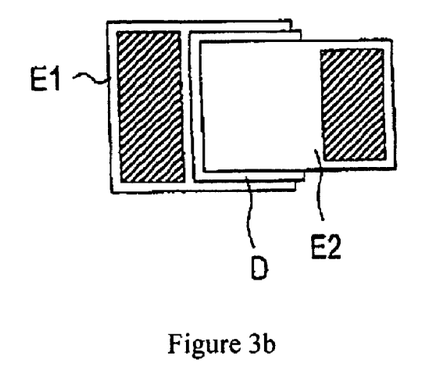

FIGS. 3a and 3b show two possibilities for increasing the quality factor of a capacitor independently of the layer structure in the area of the active capacitor in a layer structure shown for the sake of example in FIG. 2. FIG. 3a shows a cross section of a capacitor in which electrode layers E1 and E2 are elongated to form electrical supply lines. Outside of the area in which the two electrodes E1 and E2 overlap each other, the electrode layers or the supply lines formed from them are thickened with a highly conductive material so that their series electrical resistance is reduced. FIG. 3b shows a schematic plan view of a capacitor in which, additionally or alternatively to the thickening, the footprint of the capacitor is designed such that the supply line is arranged above the longer side edge of the rectangular footprint of the capacitor.

Figure 4A:
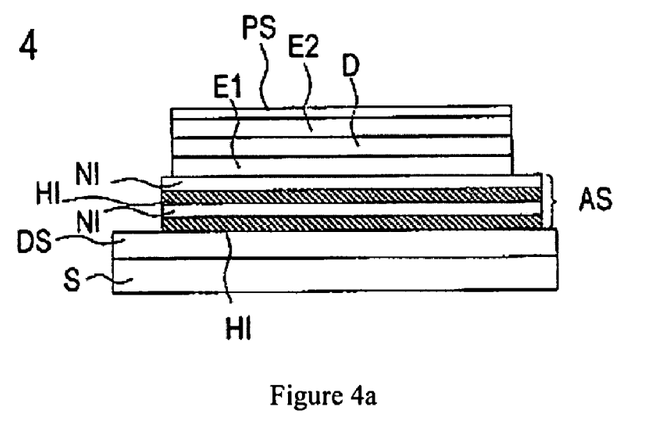
FIGS. 4a and 4b show capacitors with acoustic mirrors.
Figure 4B:
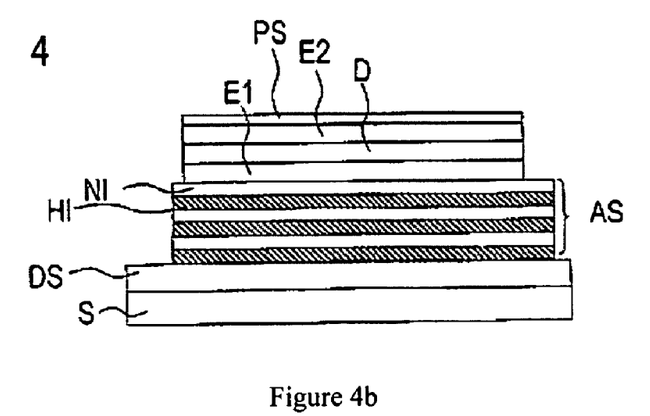

FIGS. 4a and 4b show, on the basis of a schematic cross section, an additional configuration of a layer structure usable for a capacitor. Additionally or alternatively to the layer structure according to FIG. 2, this capacitor has an acoustic mirror, which features at least one pair of mirror layers comprising a low-impedance layer and a high-impedance layer, underneath lower electrode E1. FIG. 4a shows a capacitor with a pair of mirror layers, and FIG. 4b shows a connector with a second pair of mirror layers. The mirror layers are formed, for instance, of a layer combination of 800 nm platinum and 900 nm silicon oxide, which achieve a high reflectivity factor of nearly 1 in the range from 0.9 GHz to roughly 2.1 GHz. The width of the acoustic resonance is markedly reduced with the aid of such mirror layers, so that the frequency-related useful range outside the resonances increases.

Figure 5:
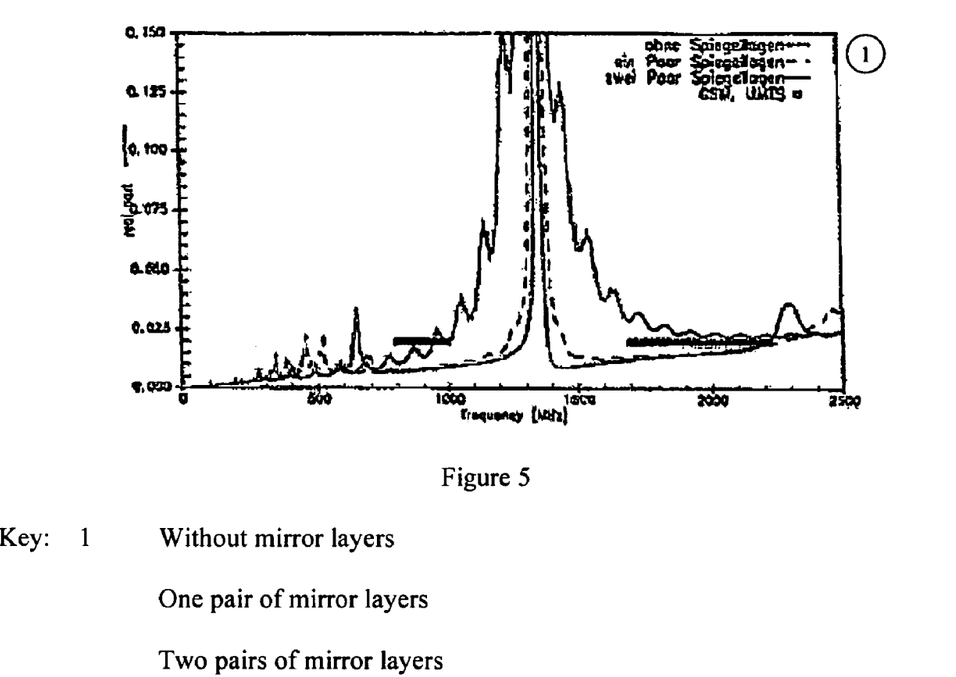
FIG. 5 shows the frequency-dependent loss angle curve of a capacitor with and without mirror layers.

FIG. 5 shows the curve of the loss angle tan δ versus frequency f. The different measurement curves correspond to a layer structures without a mirror layer, with one pair of mirror layers and with two pairs of mirror layers, and are presented one above the other for comparison. The first and second blocking regions are entered as thick bars. It is seen that the width of the resonance is sharply reduced already with one pair of mirror layers, and can be further reduced with a second pair of mirror layers. The bandwidth of the resonance can be adjusted to less than 100 MHz. The illustrated loss angle curves are provided for layer structures in which, in addition to the aforementioned mirror layer pair, the two electrodes E1 and E2 are each constructed of 600 nm Pt, and a roughly 30 μm-thick first dielectric layer of $SiO_2$ is arranged directly above aluminum oxide substrate S. The resonant frequency of this layer structure is roughly 1405 MHz; the width of the resonance (without mirror layers) is more than 200 MHz. With one pair of mirror layers, the width is reduced to 50 MHZ, and with two it is reduced to 30 MHz.

Figure 6A:
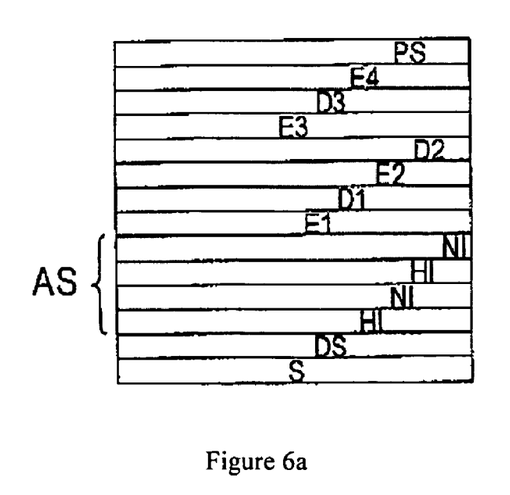
FIGS. 6a and 6b show stacked capacitors in schematic cross section.
Figure 6B:
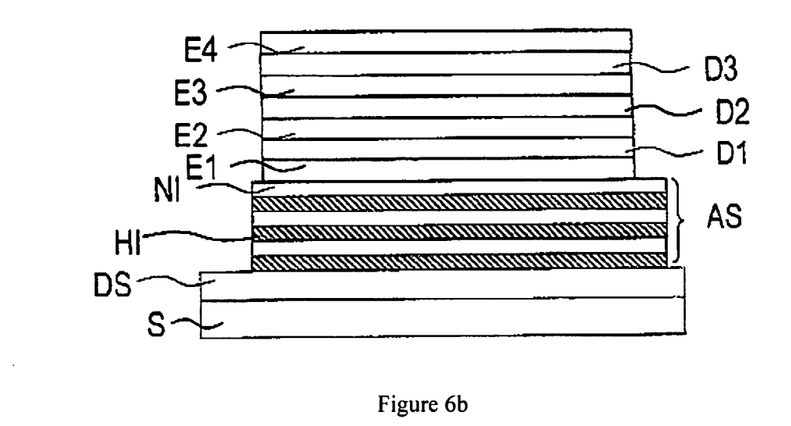

FIGS. 6a and 6b show in schematic cross section an additional variant of a layer structure usable for the capacitor. Above second electrode E2, a second ferroelectric dielectric D2 is arranged; above the latter, a third electrode E3, a third dielectric layer D3 and fourth electrode E4 are arranged. This results in a stack of three component capacitors, which can be connected in parallel, for example. FIGS. 6a and 6b show such a structure with the interposition of an acoustic mirror between substrate and first electrode E1, which is constructed here of two pairs of mirror layers. The thickness of the mirror layers and the selection of their material also corresponds in the stack capacitor to that of the single capacitor, but can deviate therefrom.

Figure 7:
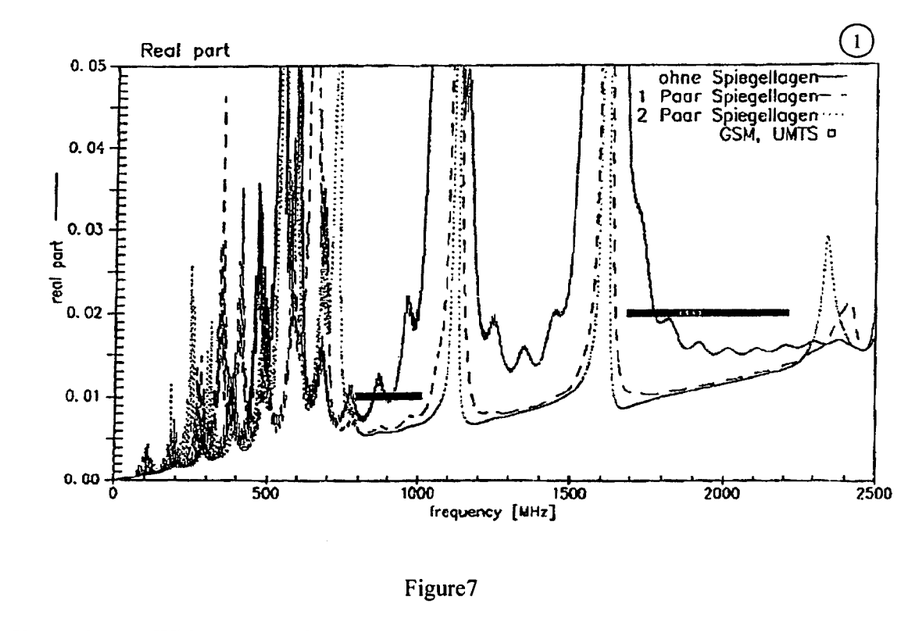
FIG. 7 shows the loss angle curve for the capacitor shown in FIG. 6.

FIG. 7 shows the curve of the loss angle versus frequency for the illustrated stack capacitor in comparison to a stack capacitor without acoustic mirror. Due to the increased number of layers in the layer structure, there is also an increase in the number of possible resonances, which are distinguished by a large loss angle and thereby a low quality factor of the capacitor in the respective frequency range. A first and a second hand range that according to the invention are to be free of resonances, together with the required suppression levels, are drawn in the figure in the form of horizontal bars. It is shown that the curve in solid lines, which is associated with the stack capacitor without an acoustic mirror, in part extends, due to the broadened resonances, into the band range envisioned for use of the capacitor. On the other hand, the curves that are associated with a stack capacitor with one pair of mirror layers (dashed line), or with two pairs of mirror layers as in FIGS. 6a and 6b (dotted line), show substantially more narrow resonances directly above 1100 MHz and at around 1600 MHz, which are arranged such that the capacitor has only a slight loss angle tan δ in the first and second blocking regions and therefore a high quality factor. This implies that even for an elaborate layer structure with a number of individual capacitor layers, a capacitor of the invention with resonances outside the blocked band ranges can be obtained by appropriate optimization.

Table 1 below again provides the layer structures of the embodiments described on the basis of FIGS. 4-7.

TABLE 1

| Layer/Example | 1/FIG. 4a | 2/FIG. 4b | 3/FIG. 6 |
|---|---|---|---|
| E4 | — | — | 600 nm Pt |
| D3 | — | — | 200 nm BST |
| E3 | — | — | 600 nm Pt |
| D2 | — | — | 200 nm BST |
| E2 | 600 nm Pt | 600 nm Pt | 600 nm Pt |
| D | 200 nm BST | 200 nm BST | 200 nm BST |
| E1 | 600 nm Pt | 600 nm Pt | 600 nm Pt |
| NI | — | 900 nm SiO$_2$ | 900 nm SiO$_2$ |
| HI | — | 800 nm Pt | 800 nm Pt |
| NI | 900 nm SiO$_2$ | 900 nm SiO$_2$ | 900 nm SiO$_2$ |
| HI | 800 nm Pt | 800 nm Pt | 800 nm Pt |
| DS | 30 μm SiO$_2$ | 30 μm SiO$_2$ | 30 μm SiO$_2$ |
| S | Al$_2$O$_3$ | Al$_2$O$_3$ | Al$_2$O$_3$ |

Additional concrete layer structures will be specified below and investigated with respect to their suitability in regard to high quality factor in the blocked band ranges. For this purpose, the structure will be kept constant from the substrate to the ferroelectric dielectric in most examples, and only upper electrode E2 will be varied.

In a first group, a layer structure over a substrate S of aluminum oxide, there are a first dielectric layer DS1 of 50 μm silicon oxide and 30 nm titanium oxide, a first electrode E1 with a conductive layer ME1 of 500 nm platinum and a first adhesion layer HE1 of 50 nm platinum, as well as a dielectric layer D of 120 nm barium/strontium titanate. Second electrode E2 follows, and above that, 300 nm Si$_3$N$_4$ as passivation. Second electrode E2 is then varied as follows:

TABLE 2

| No. | Second Electrode E2 | First Resonance |
|---|---|---|
| 4 | 960 nm Al | 1.5 GHz |
| 5 | 725 nm Pt | 1.5 GHz |
| 6 | 100 nm Pt - 80 nm TiW - 200 nm Al | 3 GHz |
| 7 | 50 nm Pt - 50 nm TiW - 200 nm Al | 3 GHz |
| 8 | 100 nm Pt - 80 nm TiW - 690 nm Al | 1.5 GHz |
| 9 | 100 nm Pt - 80 nm TiW - 115 nm Cu | 3 GHz |
| 10 | 100 nm Pt - 80 nm TiW - 840 nm Cu | 1.5 GHz |
| 11 | 100 nm Pt - 80 nm TiW - 100 nm Au | 3.5 GHz |
| 12 | 100 nm Pt - 80 nm TiW - 560 nm Au | 1.5 GHz |

Example 13 has the following layer sequence over a substrate S of aluminum oxide: 50 μm silicon oxide-1600 nm Pt-120 nm BST-440 nm Pt-1800 nm W-2500 nm Al.

The resonances lie outside of the useful band ranges due to the use of a thicker Pt lower electrode and an upper multilayer electrode. The electrical losses are reduced with respect to the other examples by the thicker electrodes.

Figure 8:
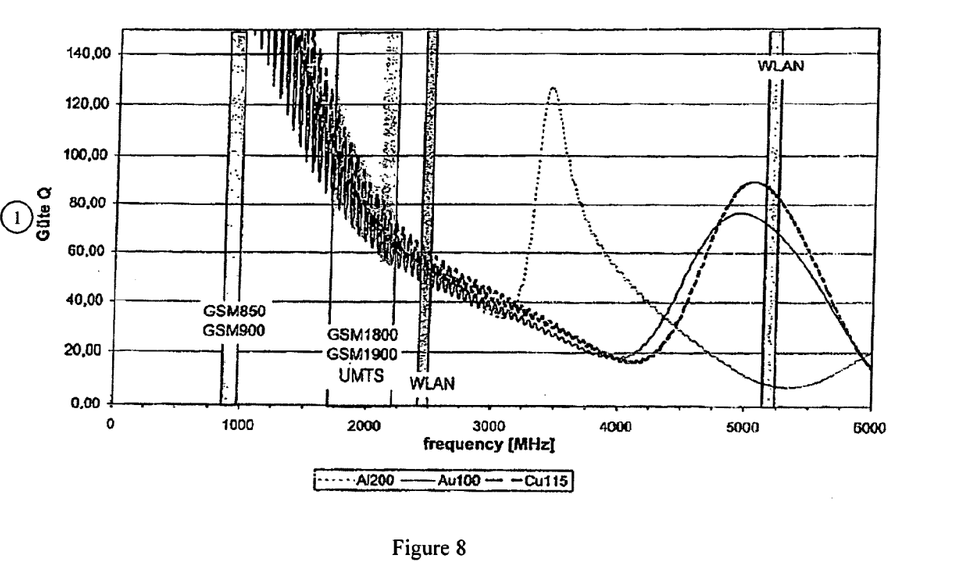
FIGS. 8-12 show the quality factor curve of resonators with different layer structures.

FIG. 8 shows the curve of quality factor Q versus frequency for relatively thin electrodes, as in examples 6, 9 and 11. In the variant with gold (solid line) or copper (thick dashed line) as conductive upper metal layer ME2, the resonance with low electrical quality factor lies at about 4 GHz. One thereby obtains acceptable electrical quality factors of more than 60 both in the two gigahertz range (second band range) and in the five gigahertz range (fourth band range). Since aluminum (see thin dotted line) has an acoustic impedance comparable to silicon, the boundary surface between the two layers has no acoustic effect, so that the boundary surface of silicon nitride and air is responsible for the first resonance. It therefore lies at a lower frequency of ca. three gigahertz. For this embodiment with 200 nm aluminum as upper conductive metal ME2, this results in a lower quality factor at five gigahertz.

Figure 9:
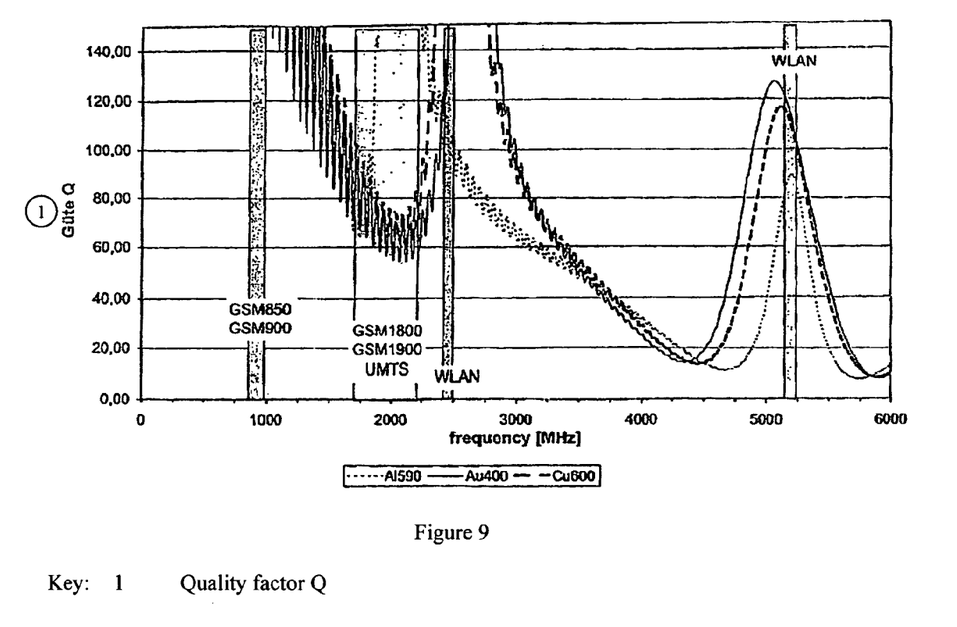

FIG. 9 shows the quality factor curves for three additional embodiments based on a structure similar to FIG. 8. Only the layer thickness of the conductive material used for second electrode E2 is increased. The three illustrated curves correspond to embodiments with 590 nm Al (example 14), 400 nm Au (example 15) and 600 nm Cu (example 16). The other layer materials and layer thicknesses remain unchanged from the embodiments associated with FIG. 8. With the higher thicknesses of the aluminum, copper or gold electrode, it is attempted to shift the first resonance into the range between 1 GHz and 1.7 GHz, and to achieve as high an electrical quality factor as possible in all relevant frequency ranges, i.e. the first to the fourth band ranges. This is not possible in this case with gold and copper. With aluminum as the upper conductive layer, the quality factor becomes low only in the lower range of the 2 GHz band, since the latter lies in the vicinity of the resonance at roughly 1.7 GHz. The quality factor for the first band range is high for all three embodiments, and the quality factor for the third and fourth band ranges remains sufficiently high for all three embodiments.

Figure 10:
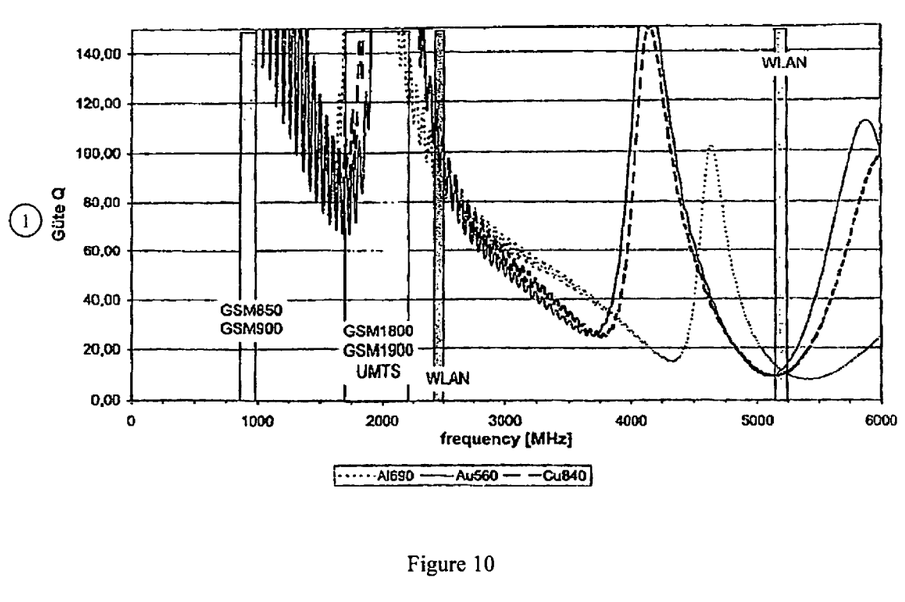

FIG. 10 shows the quality factor curves for three additional embodiments, in which the same layer structure and the same line association is used as in FIGS. 8 and 9, and the upper conductive layer is merely further increased in thickness. Three embodiments are considered, in which the upper conductive layer consists of 560 nm of aluminum (example 8), 690 nm of gold (example 12) or 840 nm of copper (example 10). In this embodiment, the requirement for a high electrical quality factor at 5 GHz and 2.5 GHz, i.e. in the third and fourth band range, is dropped. In return, a high quality factor can be achieved in the 2 GHz range with all three embodiments due to the increased layer thicknesses.

Figure 11:
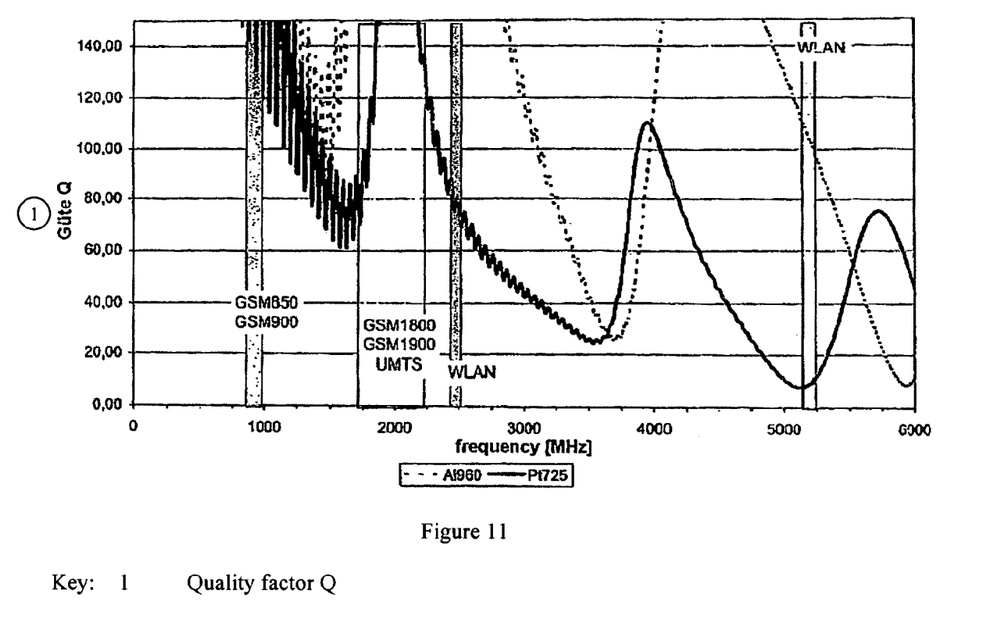

FIG. 11 shows the quality factor curves for two additional embodiments which again have a layer structure corresponding to FIGS. 8-10, but wherein upper conductive layer ME2 was further increased. Two embodiments with 960 nm Al (example 4, see dashed line) and 725 nm Pt (example 5, see solid line), respectively, were studied. For the embodiment with aluminum, it was shown that the boundary surface with the air and the boundary surface of the lower platinum layer with aluminum were the most acoustically active. Therefore a high electrical quality factor can be obtained with aluminum in all relevant frequency ranges, i.e., in the first through fourth band ranges. This cannot be achieved with only platinum as the conductive layer of the upper electrode.

Figure 12:
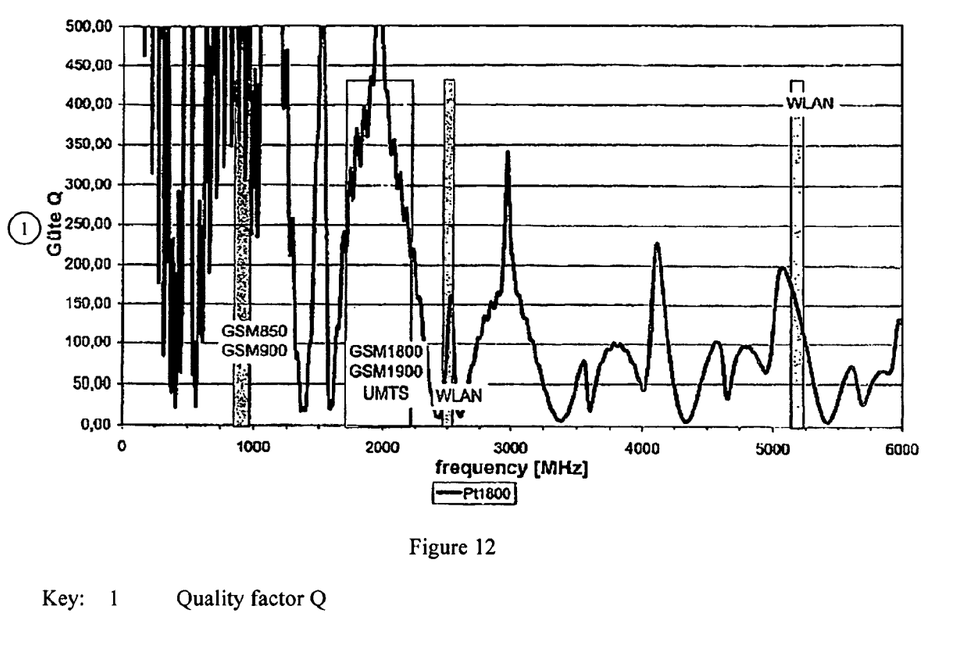

FIG. 12 shows the electrical quality factor curve of a capacitor according to example 17, in which a thick, 1800 nm platinum layer is used. The remainder of the layer structure corresponds to examples 4-11. A good quality factor at 1 GHz and 2 GHz as well as a medium quality factor at 2.5 and 5 GHz are observed.

Above an aluminum oxide substrate, the layer structure of example 13 has 50 μm of silicon oxide as a dielectric layer DS, 1600 nm of platinum as first electrode E1, 120 nm of BST as dielectric D, and as an upper electrode E2 a triple layer consisting of 440 nm of platinum, 1800 nm of tungsten and 2500 nm of aluminum.

Due to the overall very thick electrodes, the electrical resistance is markedly reduced, so that high quality factors are achieved outside the acoustic resonances. However, many resonances occur because of the relatively thick overall structure, but with the specified layer structure they all lie outside the usable band ranges one through four. The highest quality factors up to this point are achieved in all band ranges with these embodiments.

An additional further optimized embodiment 18 has, above an aluminum oxide substrate, a structure that comprises the following layers: 50 µm of silicon oxide, 30 nm of titanium oxide, 525 nm platinum, 200 nm of BST, 700 nm of Pt and 350 nm of PSG as a passivation layer PS. High quality factors are achieved in all four band ranges with this embodiment as well. The resonant frequencies that can form in the layer structure all lie clearly outside the band ranges.

It is shown that with the layer structure, it is possible to realize capacitors that have high quality factors in all four band ranges used for mobile communication, and are therefore suitable for use in circuitry and circuits that operate with one or more of these frequencies. The capacitors are therefore suitable for use in matching circuits, amplifier circuits, filters and other circuits inside terminal devices for mobile communication, and in particular for use in cell phones. Circuits with these capacitors can be produced in integrated form on suitable substrates and connected to one another. For integrated interconnection, structuring steps are necessary that take place after deposition of the first or second and possibly additional electrode layers, as well as after deposition of the dielectric or ferroelectric. The capacitors are tunable with respect to their dielectric constant, and therefore their capacitance, by an application of a bias voltage. It is therefore possible to construct variable circuits that can be matched to an external environment by virtue of the tunability of their capacitance. In particular, the capacitors can be set up for different operating frequencies and optimized to the respective operating frequency by appropriate tuning. In this way it is also possible with a single circuit to realize different constellations, each of which can be matched to a given usable band range. It is therefore also possible to markedly reduce the complexity of the circuitry environment of multi-band or multi-mode terminal devices with the tunable capacitors, since what hitherto were separate circuits can now be realized with a single tunable circuit. In addition to the complexity, the space requirements for the circuits as well as the costs of the circuit are reduced.

It was only shown in the embodiments that suitable layer structures can be realized, but suitable realizations are not limited to the embodiment examples that were shown. It therefore lies within the scope to modify the layer structures by omission of individual layers, addition of layers, by changes of material or by changes of thickness.

The quality factor of the capacitors in all embodiments shown can be further improved by using acoustic mirrors, whereby the widths of the resonances appearing in the layer structure can be markedly reduced even with a single pair of mirror layers, consisting of a low-impedance layer NI and a high-impedance layer HI introduced in the layer structure underneath lower electrode E1. Conversely, the quality factor is markedly increased in the ranges outside the resonances. With acoustic mirrors, improved properties that justify the increased expense for manufacturing of the acoustic mirror can be obtained for complex optimization problems in all four band ranges. With the aid of the acoustic mirrors it is also possible to produce more complex layer structures with a plurality of individual capacitors produced one above the other that each comprise a ferroelectric layer embedded between two electrodes, and to obtain a sufficient quality factor in three or four band ranges.

The invention claimed is:

1. A capacitor with a tunable dielectric constant, the capacitor comprising:
    a multilayer structure on a ceramic or crystalline substrate, the multilayer structure comprising:
        a lower electrode;
        an upper electrode; and
        a dielectric between the lower electrode and the upper electrode, the dielectric being tunable by a voltage applied to the electrodes,
    wherein the multilayer structure is configured such that resonant oscillation modes of bulk acoustic waves can be propagated in the multilayer structure and a number of layers, material of the layers, and thicknesses of the layers in the multilayer structure are configured such that the resonant frequencies of the oscillation modes are outside a first band range used in mobile telephones of between 810 and 1000 MHz, second band range used in mobile telephones of between 1700 and 2205 MHz and third band range used in mobile telephones of between 2400 and 2483.5 MHz.

2. The capacitor of claim 1, wherein the dielectric comprises a dielectric selected from the group consisting of strontium titanate, barium/strontium titanate and lead zirconate/titanate.

3. The capacitor of claim 1, wherein the multilayer structure is further configured such that the resonant frequencies of the oscillation modes are outside a fourth band range of between 5150 and 5250 MHz.

4. The capacitor of claim 3, wherein the multilayer structure is further configured such that a lowest resonant frequency is between the second and the third band ranges and additional resonance frequencies are between the third and fourth band ranges and above the fourth band range.

5. The capacitor of claim 1, wherein the multilayer structure is further configured such that a lowest resonant frequency is between the first and the second band ranges and additional resonance frequencies are between the second and the third band ranges and above the third band range.

6. The capacitor of claim 1, wherein the substrate comprises $Al_2O_3$.

7. The capacitor of claim 1, wherein the dielectric has a thickness of 50-500 nm.

8. The capacitor of claim 1, wherein at least the lower electrode comprises a platinum layer directly adjacent to the dielectric.

9. The capacitor of claim 1, wherein at least one of the lower electrode and the upper electrode comprises:
    an adhesion layer of platinum, molybdenum or tungsten having a thickness of less than 100 nm, and
    a layer of copper, gold or aluminum.

10. The capacitor of claim 1, further comprising an electrically insulating planarization layer on a top surface of the substrate.

11. The capacitor of claim 1, further comprising at least one layer pair comprising a dielectric layer and an additional electrode above the upper electrode.

12. The capacitor of claim 11, further comprising three dielectric layers and an electrode between each pair of dielectric layers between the upper electrode and the lower electrode.

13. The capacitor of claim 1, further comprising at least one layer pair configured to function as an acoustic mirror between the substrate and the lower electrode, the at least one layer pair comprising a high-impedance layer and a low-impedance layer, wherein the impedance of the high-impedance layer differs from the impedance of the low impedance layer by at least a factor of 1.5.

14. The capacitor of claim 13, wherein a platinum layer with a thickness of 700-900 nm is configured to provide a high-impedance layer, and an $SiO_2$ layer with a thickness of 800-1000 nm is configured to provide a low-impedance layer.

15. The capacitor of claim 1, wherein the substrate comprises ceramic and has a surface roughness of more than 100 nm.

16. The capacitor of claim 1, wherein an upper layer of the multilayer structure comprises an elastic layer.

17. The capacitor of claim 1, wherein the multilayer structure is rectangular and the capacitor further comprises an electrical supply line electrically connected to the upper and lower electrodes on the wider sides of the rectangle.

18. The capacitor of claim 1, wherein the multilayer structure further comprises one or more additional layers selected from acoustic matching layers, adhesion layers and growth layers for the dielectric layer.

19. An electrical circuit comprising:
a capacitor comprising:
a multilayer structure on a ceramic or crystalline substrate, the multilayer structure comprising:
a lower electrode;
an upper electrode; and
a dielectric between the lower electrode and upper electrode, the dielectric being tunable by a voltage applied to the electrodes,
wherein the multilayer structure is configured such that resonant oscillation modes of bulk acoustic waves can be propagated in the multilayer structure and a number of layers, material and thicknesses of the layers in the multilayer structure are configured such that the resonant frequencies of the oscillation modes are outside a first band range used in mobile telephones of between 810 and 1000 MHz, second band range used in mobile telephones of between 1700 and 2205 MHz and third band range used in mobile telephones of between 2400 and 2483.5 MHz;
one or more passive circuit components connected to the capacitor, the passive circuit components being selected from the group consisting of capacitors, inductors, and resistors,
wherein the circuit is configured to process signals in at least one of the first, second, or third band ranges.

20. The circuit of claim 19, further comprising a device configured to apply an adjustable DC bias voltage to the upper and lower electrodes.

21. The circuit of claim 19, further comprising additional capacitors connected in an integrated manner to the additional passive circuit components.

22. The circuit of claim 19, wherein the circuit comprises a phase shifter, a decoupler, a circuit for impedance matching or a tunable filter circuit.

* * * * *

UNITED STATES PATENT AND TRADEMARK OFFICE
CERTIFICATE OF CORRECTION

| | | |
|---|---|---|
| PATENT NO. | : 8,009,407 B2 | |
| APPLICATION NO. | : 12/064869 | |
| DATED | : August 30, 2011 | |
| INVENTOR(S) | : Anton Leidl et al. | |

It is certified that error appears in the above-identified patent and that said Letters Patent is hereby corrected as shown below:

Claim 1, Column 12, Line 19 – delete "hand" and insert -- band --, therefor.

Claim 3, Column 12, Line 30 – delete "hand" and insert -- band --, therefor.

Signed and Sealed this
Eighteenth Day of October, 2011

David J. Kappos
*Director of the United States Patent and Trademark Office*